(12) United States Patent
Gross et al.

(10) Patent No.: US 8,576,699 B2
(45) Date of Patent: Nov. 5, 2013

(54) METHOD FOR OPERATING A NETWORK HAVING A RING TOPOLOGY

(75) Inventors: Alexander Gross, Burgsinn (DE); Hans Juergen Preu, Lohr am Main (DE)

(73) Assignee: Robert Bosch GmbH, Stuttgart (DE)

( * ) Notice: Subject to any disclaimer, the term of this patent is extended or adjusted under 35 U.S.C. 154(b) by 930 days.

(21) Appl. No.: 11/284,728

(22) Filed: Nov. 21, 2005

(65) Prior Publication Data

US 2006/0126498 A1 Jun. 15, 2006

(30) Foreign Application Priority Data

Nov. 22, 2004 (DE) .......................... 10 2004 056 364

(51) Int. Cl.
*H04J 3/06* (2006.01)
(52) U.S. Cl.
USPC .......................................... 370/217; 370/225
(58) Field of Classification Search
USPC ............ 370/89, 85, 401, 463, 469, 351, 460, 370/489, 85.5, 216–229, 465, 242–245; 455/67; 398/10
See application file for complete search history.

(56) References Cited

U.S. PATENT DOCUMENTS

| | | | | |
|---|---|---|---|---|
| RE28,958 E | * | 9/1976 | Zafiropulo et al. | ........... 375/356 |
| 4,663,748 A | * | 5/1987 | Karbowiak et al. | ........... 370/224 |
| 6,154,464 A | * | 11/2000 | Feuerstraeter et al. | ........ 370/463 |
| 6,222,854 B1 | * | 4/2001 | Dove | ............................. 370/465 |
| 6,249,510 B1 | * | 6/2001 | Thompson | ..................... 370/223 |
| 7,009,995 B1 | * | 3/2006 | Bohrer et al. | .................. 370/460 |
| 7,113,698 B1 | * | 9/2006 | Ryhorchuk et al. | ............ 398/10 |
| 7,317,681 B1 | * | 1/2008 | Ben-Dvora et al. | ........... 370/224 |
| 7,385,919 B2 | * | 6/2008 | Koestner et al. | .............. 370/222 |
| 2002/0131452 A1 | | 9/2002 | Bruckner et al. | ............. 370/494 |
| 2003/0058789 A1 | * | 3/2003 | Sugawara et al. | ............. 370/222 |
| 2004/0081083 A1 | | 4/2004 | Sekihata | ........................ 370/222 |
| 2004/0132409 A1 | * | 7/2004 | Arnold et al. | ............... 455/67.11 |
| 2005/0180437 A1 | * | 8/2005 | Twomey | ........................ 370/401 |
| 2007/0183319 A1 | * | 8/2007 | Rug et al. | ...................... 370/228 |

FOREIGN PATENT DOCUMENTS

WO      WO02/091681       11/2002

OTHER PUBLICATIONS

"Reduced Gigabit Media Independent Interface" Dec. 10, 2000, Version 1.3—Reduced Pin-count Interface for Gigabit Ethernet Physical Layer Devices, pp. 1-8.
"An Introduction to Resilient Packet Ring Technology," Oct. 2001, pp. 1-16.

* cited by examiner

*Primary Examiner* — Kwang B Yao
*Assistant Examiner* — Syed M Bokhari
(74) *Attorney, Agent, or Firm* — Kenyon & Kenyon LLP

(57) ABSTRACT

A method for operating a network having a ring topology, in which a faulty connection between two stations of the network is detected by monitoring carrier signals. This method enables a faulty connection to be quickly detected in a network. Data may be advantageously rerouted in response to the detection.

19 Claims, 2 Drawing Sheets

METHOD FOR OPERATING A NETWORK HAVING A RING TOPOLOGY

FIELD OF THE INVENTION

The present invention relates to a method for operating a network having a ring topology, a device for carrying out this method, and a corresponding network.

BACKGROUND INFORMATION

The importance of networks or network services has risen steadily in recent years. In addition to their generally known use as a communication platform, e.g., the Internet, the use of networks in industrial environments is also growing in importance, e.g., in networked control and automation systems.

In industrial applications, in particular, an error-free, continuously available network connection between the individual stations is important to avoid production problems or even outages.

However, a connection between the stations which remains uninterrupted over time can never be guaranteed, since problems may always occur within the connection, e.g., cable ruptures and the like.

In network technology, therefore, a number of methods exists for detecting connection problems and eliminating them, if necessary.

FDDI is a network standard which is often used for backbones. Optical waveguides (OWG), i.e., glass fibers, which provide optimum protection against electromagnetic interference, are generally used for transmission. More economical copper lines are also used for short transmission paths which provide the same transmission rate.

FDDI is an ANSI (American National Standards Institute) network standard whose network topology is designed in the shape of a ring. Most of the parameters are defined in ANSI X3T9.5, and parts have been adopted by ISO (International Organization for Standardization). The current version of the standard is defined in ANSI X3T12.

The FDDI standard supports multiple designs of the network topology, and the dual-ring structure is described below by way of example.

An FDDI network having a dual-ring structure includes a primary (p) ring and a secondary (s) ring. Each station has one input interface (E), i.e., an input pE, sE, and one output interface (A), i.e., an output pA, sA, for each ring. The primary and secondary rings have opposite directions of transmission.

During normal data transmission, each station forwards the data it has received at one input to the corresponding output. This takes place regardless of whether the data is intended for that station and is therefore also processed by this station. When the data is returned to the original sender, the data transmission has been completed correctly, and the original sender takes the data from the ring.

The secondary ring remains unused in normal, error-free operation. Nevertheless, null data is transmitted to continuously check whether this ring is free of errors.

If the dual ring is interrupted, e.g., due to a cable defect, the data transmitted by a station on the primary ring is not returned to that station.

If an error occurs, a ring interruption is detected or a time limit is exceeded, a claim process is initiated. If this process is unsuccessful, a beacon process is triggered.

Stations which do not receive any corresponding frames during the course of the beacon process either identify the preceding station or the fiber-optic cable as defective and initiate a ring reconfiguration.

To do this, stations which are located upstream from the cable rupture in the direction of the ring stop forwarding the data received via the pE port and instead reroute it to the secondary ring via the sA port. Because this ring uses the opposite direction of data flow, the rupture point is thereby bypassed.

A method for detecting a line interruption is discussed in International patent application WO 02/065219 A2, in which a master evaluates its own transmitted telegrams which are returned to the master via the dual ring. If the master's telegrams fail to be returned, this is evaluated as a line interruption.

The above-discussed method may require a great deal of time to detect and subsequently eliminate a fault, which may hinder its use in systems which require a nearly uninterrupted connection, such as industrial manufacturing systems.

There is also a method for quickly detecting a line break in dual-ring OWG structures via missing input signal edges and subsequently reconfiguring the two rings ("Fehlertolerantes Kommunikationssystem für hochdynamische Antriebsregelungen" [Error-Tolerant Communication Systems for Highly Dynamic Drive Regulation Systems], S. Schulze, Dissertation, Darmstadt, 1995). Glass fibers are highly sensitive in their handling and require complex connecting techniques. In addition, the use of OWG technology increases the cost of providing and maintaining the transmission medium itself as well as plugs, network cards, etc.

SUMMARY OF THE INVENTION

Against this background, a method is provided, according to the present invention, for operating a network having a ring topology, as well as a device which uses this method, and finally a corresponding network, according to the independent patent claims. Advantageous embodiments are described herein.

In the method according to the present invention for operating a network having a ring topology, a faulty connection between two network stations is detected by monitoring the carrier signal, also referred to as the carrier. In wireline communications technology, a carrier frequency, in particular, which is present at the connecting line in the form of an a.c. voltage, is referred to as the carrier signal or carrier. Depending on the transmission standard, the carrier satisfies other requirements. In particular, it receives modulated data, for example payload data or IDLE data, which is transmitted on the carrier during transmission pauses.

In the method according to the present invention, the physical connection between two stations advantageously corresponds to an Ethernet standard using electrical data routing. In principle, the Ethernet standard supports not only electrical data routing, but also optical data routing via optical waveguides. The advantageous use of an Ethernet standard using electrical data routing, for example according to the IEEE 802.3 standard, in a network having a ring topology, in particular in a time-critical environment, makes it possible to use tried and tested components that are economical to provide and easy to maintain. Of course, an Ethernet standard using optical data routing may also be used.

In the method according to the present invention, it is advantageous to use the false carrier indication signal for monitoring the carrier signal. This signal is provided by Ethernet interface circuits, which makes it easy to use. The use of this signal enables a faulty connection to be detected within just a few hundred nanoseconds.

The method according to the present invention is advantageously used in a network having a contradirectional dual-ring structure in which each station has one input interface and one output interface for each ring. By using a dual-ring structure, it is possible to maintain network operation by appropriately rerouting the data even if one connecting path fails. A network whose stations are able to reroute data in this manner is known as a self-healing network.

In the exemplary embodiment of the method, at least one station monitors the carrier signal at one input interface.

In another exemplary embodiment, with the method according to the present invention, if, after a faulty connection is detected, the station may route the data from its own output interface, which is connected to the input interface of a second station, to its own input interface, which is connected in a faulty manner to the output interface of the second station. This advantageous routing of data after detecting a faulty connection enables network operation, e.g., in a dual-ring network, to be easily maintained.

In another exemplary embodiment, the method according to the present invention is used in a network according to a SERCOS standard. For example, a network according to the SERCOS III standard may be used, which supports the use of Ethernet components in a SERCOS connection.

The device according to the present invention for operating a network having a ring topology includes an arrangement for detecting a faulty connection between two network stations by monitoring the carrier signal.

The exemplary device according to the present invention may include an arrangement for implementing one or all advantageous exemplary embodiments of the method according to the present invention. In particular, the exemplary device according to the present invention may be used in an Ethernet network, the false carrier indication signal, for example, being used to monitor the carrier signal.

In another exemplary embodiment, the exemplary device according to the present invention includes two input interfaces, two output interfaces and two multiplexer circuits which connect the input interfaces to the output interfaces in such a way that, during error-free operation, each input interface is connected to a corresponding output interface and, upon detection of a faulty connection at one input interface, the corresponding output interface is connected to the other input interface. This exemplary embodiment is easy and economical to produce.

A network according to the present invention includes at least one exemplary device according to the present invention.

DETAILED DESCRIPTION

Figure 1:
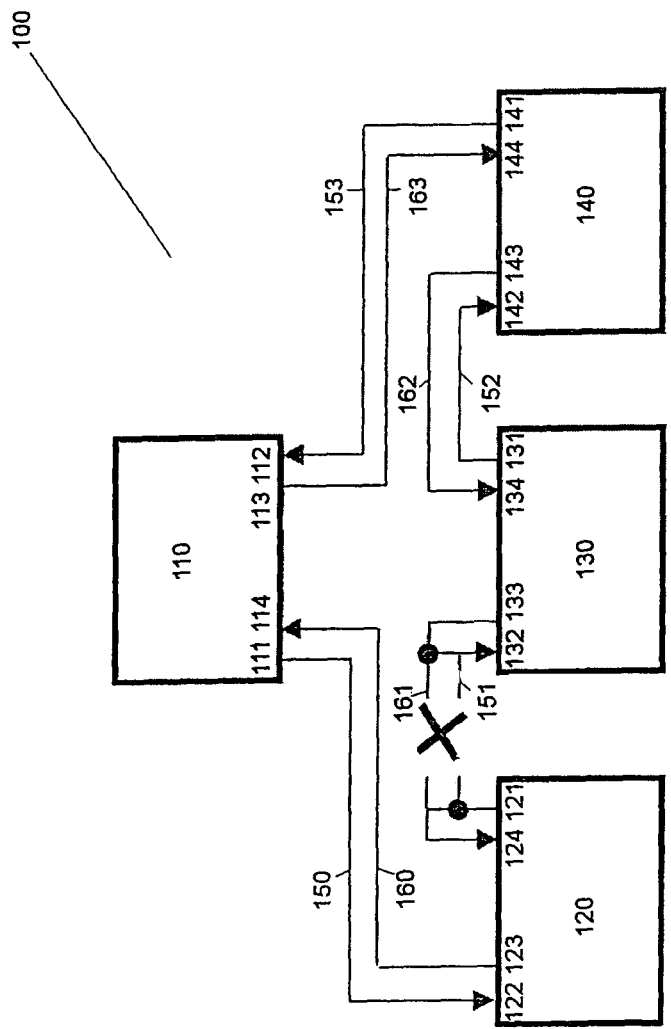
FIG. 1 shows a network having a dual-ring structure, a connection between two stations being interrupted.

In FIG. 1, a network having a ring topology is identified as a whole by reference numeral 100. Network 100 includes four stations 110, 120, 130, 140, a primary ring 150, 151, 152, 153 and a secondary ring 160, 161, 162, 163. Each station 110, 120, 130, 140 has one output interface 111, 121, 131, 141 and one input interface 112, 122, 132, 142 for primary ring 150, 151, 152, 153. Each station 110, 120, 130, 140 also has one output interface 113, 123, 133, 143 and one input interface 114, 124, 134, 144 for secondary ring 160, 161, 162, 163.

In this manner, each station is connected to an adjacent station via two ring connecting sections, via one input interface and one output interface. For example, station 110 is connected to station 120 via primary ring section 150 from output interface 111 of station 110 to input interface 122 of station 120.

The two stations 110, 120 are also connected via ring section 160 of the secondary ring via interfaces 123 and 114.

In the present exemplary embodiment, each station 110, 120, 130, 140 monitors, at each of its input interfaces 112, 114, 122, 124, 132, 134, 142, 144, the carrier signal or carrier on the particular connecting section. Connecting sections 150, 160, 151, 161, 152, 162, 153, 163 are physically designed as Ethernet connections having electrical data transmission, for example as Fast Ethernet according to the IEEE 802.3u standard.

If an interruption occurs in connecting sections 151 and 161, station 120 detects a change in the carrier signal at its input interface 124, and station 130 does the same at its input interface 132.

During error-free operation, the data undergoes multiple coding prior to transmission (e.g., PCS code, scrambler). This coding produces a high-frequency carrier signal even if only zeros or ones or even no logical data at all are transmitted. In the event of a line interruption, the carrier signal remains statically at a constant level. Stations 120 and 130 thereby determine that the connection from their input interfaces 124 and 132 to the corresponding output interfaces of the adjacent station is faulty.

In another exemplary embodiment of the method according to the present invention, the false carrier indication signal of the Ethernet chip may be used for detecting the interruption. In the event of a line interruption, the decoding of the carrier signal produces a random data pattern of zeros and ones. This is usually an invalid data pattern which the chip detects as being defective and to which it responds accordingly, i.e., by displaying a false carrier indication signal.

To obtain a valid data pattern, code groups must be transmitted in a predetermined order during the transmission of telegrams, starting with a start-of-stream sequence. During transmission pauses, i.e., when no data is being transmitted logically, the sender transmits IDLE codes. No other data patterns are allowed. The failure to transmit the IDLE codes generates invalid code groups and also causes the carrier monitoring system to respond.

According to this exemplary embodiment of the present invention, it is not necessary to detect a faulty connection on a higher-level network layer, for example by the fact that data transmitted to a ring via an output interface fails to return to the sender after one complete cycle.

According to another exemplary embodiment of the method according to the present invention, both stations 120 and 130 reroute their data accordingly. Station 120 routes its data from its output interface 121 to its input interface 124, i.e., from the primary ring to the secondary ring. Station 130 routes its data from output interface 133 to input interface 132, i.e., from the secondary ring to the primary ring. Of course, these stations route the data in the same manner if only one of ring sections 151, 161 is interrupted.

The ring is now closed again. Data transmitted on both rings reaches each station and ultimately returns to the transmitting station.

Figure 2:
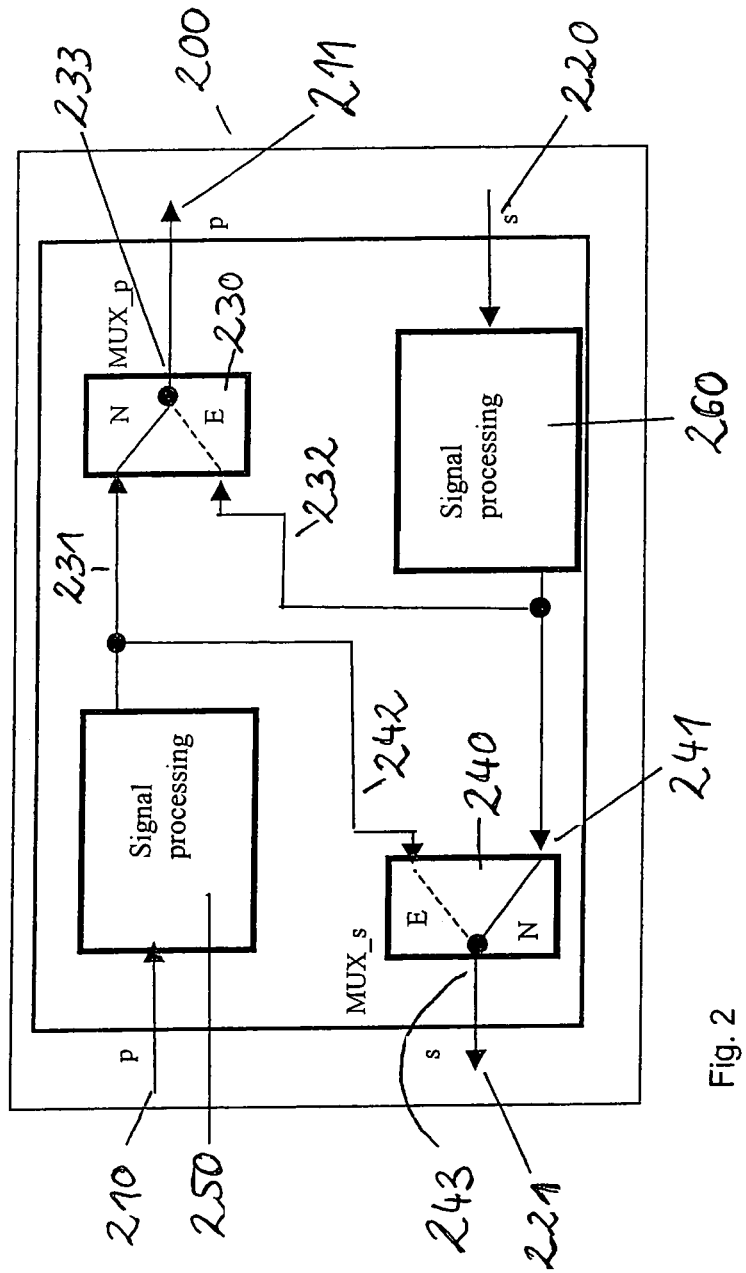
FIG. 2 shows an exemplary embodiment of the exemplary device according to the present invention.

FIG. 2 shows an exemplary embodiment of a device according to the present invention. The exemplary device as a whole is identified by reference numeral 200. Device 200 includes an input interface 210 and an output interface 211 for the primary ring, which is identified by p, and an input interface 220 and an output interface 221 for the secondary ring, which is identified by s. In particular, the device may be an integral part of a station 110, 120, 130, 140 from FIG. 1, or it may be the station itself.

Device 200 also includes two multiplexer circuits 230, 240 and two signal processing circuits 250, 260. Multiplexer circuit 230 includes an input interface 231 for primary ring p, an input interface 232 for secondary ring s, and an output interface 233. Signal processing circuit 250 is connected to input interface 210 of device 200. The multiplexer output is connected to output interface 211 of device 200.

Multiplexer circuit 240 includes an input interface 241 for secondary ring s, an input interface 242 for primary ring p, and an output interface 243. The latter is connected to output interface 221 of device 200.

Input interface 220 of device 200 is connected to the input of signal processing circuit 260.

Device 200 checks the carrier signal on both rings p and s at its input interfaces 210, 220.

If device 200 detects a faulty connection at its input interface 210 on primary ring p, multiplexer circuit 230 interrupts the connection between input interface 231 and output interface 233 and instead connects input interface 232 to output interface 233. In this manner, a connection is established from input interface 220 of device 200 to output interface 211 of the device. Secondary ring s is thereby connected to primary ring p.

If device 200 detects a faulty connection at its input interface 220 on secondary ring s, multiplexer circuit 240 interrupts the connection between input interface 241 and output interface 243 and instead connects input interface 242 to output interface 243. In this manner, a connection is established from input interface 210 of primary ring p to output interface 221 of secondary ring s.

What is claimed is:

1. A method for operating a network having a ring topology, the method comprising: monitoring a carrier signal, wherein a false carrier indication signal is used to monitor the carrier signal; detecting a faulty connection between two stations of the network by monitoring the carrier signal; and in the event of a faulty connection link, correspondingly rerouting data to maintain a network operation; wherein the network has a contradirectional dual-ring structure, wherein each station of the network has an input interface and an output interface for each ring, and wherein a physical connection between two stations of the network corresponds to an Ethernet standard using electrical data routing, wherein at least one first station monitors the carrier signal at one input interface, wherein, upon detection of a faulty connection, the first station reroutes data from its own output interface, which is connected to an input interface of a second station, to its own input interface, which is connected in a faulty manner to an output interface of the second station, wherein a failure to transmit IDLE codes during a transmission pause generates an invalid code group and causes a response during the monitoring.

2. The method of claim 1, wherein the method is used in the network according to a SERCOS standard.

3. The method of claim 1, wherein the network is operated according to a SERCOS standard.

4. The method of claim 1, wherein a first multiplexer circuit includes the input interface for the primary ring, the input interface for the secondary ring, and a first output interface, wherein a first signal processing circuit is connected to the input interface and the multiplexer output is connected to the output interface, and wherein a second multiplexer circuit includes the input interface for the secondary ring, the input interface for the primary ring, and a second output interface.

5. The method of claim 4, wherein if a faulty connection is detected at the input interface on the primary ring, the first multiplexer circuit interrupts the connection between its input interface and its output interface and instead connects the other input interface to the output interface, so that a connection is established from the input interface to the output interface, and so that the secondary ring is connected to the primary ring.

6. The method of claim 4, wherein if a faulty connection is detected at the input interface on the secondary ring, the second multiplexer circuit interrupts the connection between its input interface and its output interface and instead connects the other input interface to the output interface, so that a connection is established from the input interface of the primary ring to the output interface of the secondary ring.

7. The method of claim 1, wherein the false carrier indication signal is provided by an Ethernet interface circuit.

8. The method of claim 1, wherein the network includes at least two stations of an industrial manufacturing system.

9. A device for operating a network having a ring topology, comprising: a monitoring arrangement to monitor a carrier signal, wherein a false carrier indication signal is used to monitor the carrier signal; a detecting arrangement to detect a faulty connection between two stations of the network by monitoring the carrier signal; and a rerouting arrangement, for use in the event of a faulty connection link, to correspondingly reroute data to maintain a network operation; wherein the network has a contradirectional dual-ring structure, wherein each station of the network has an input interface and an output interface for each ring, and wherein a physical connection between two stations of the network corresponds to an Ethernet standard using electrical data routing, wherein the carrier signal is monitored at one input interface of a first station, wherein, upon detection of a faulty connection, the first station reroutes data from its own output interface, which is connected to an input interface of a second station, to its own input interface, which is connected in a faulty manner to an output interface of the second station, wherein a failure to transmit IDLE codes during a transmission pause generates an invalid code group and causes the monitoring arrangement to respond.

10. The device of claim 9, wherein the network is operated according to a SERCOS standard.

11. The device of claim 9, wherein a first multiplexer circuit includes the input interface for the primary ring, the input interface for the secondary ring, and a first output interface, wherein a first signal processing circuit is connected to the input interface and the multiplexer output is connected to the output interface, and wherein a second multiplexer circuit includes the input interface for the secondary ring, the input interface for the primary ring, and a second output interface.

12. The method/device of claim 11, wherein if a faulty connection is detected at the input interface on the primary ring, the first multiplexer circuit interrupts the connection between its input interface and its output interface and instead connects the other input interface to the output interface, so that a connection is established from the input interface to the output interface, and so that the secondary ring is connected to the primary ring.

13. The method/device of claim 11, wherein if a faulty connection is detected at the input interface on the secondary ring, the second multiplexer circuit interrupts the connection between its input interface and its output interface and instead connects the other input interface to the output interface, so that a connection is established from the input interface of the primary ring to the output interface of the secondary ring.

14. The device of claim 9, wherein the false carrier indication signal is provided by an Ethernet interface circuit.

15. The device of claim 9, wherein the network includes at least two stations of an industrial manufacturing system.

16. A network having a ring topology, comprising: a device to detect a faulty connection between two stations of the network, the device including: a monitoring arrangement to monitor a carrier signal, wherein a false carrier indication signal is used to monitor the carrier signal; a detecting arrangement to detect a faulty connection between two stations of the network by monitoring the carrier signal; and a rerouting arrangement, for use in the event of a faulty connection link, to correspondingly reroute data to maintain a network operation; wherein the network has a contradirectional dual-ring structure, wherein each station of the network has an input interface and an output interface for each ring, and wherein a physical connection between two stations of the network corresponds to an Ethernet standard using electrical data routing, wherein the carrier signal is monitored at one input interface of a first station, wherein, upon detection of a faulty connection, the first station reroutes data from its own output interface, which is connected to an input interface of a second station, to its own input interface, which is connected in a faulty manner to an output interface of the second station wherein a failure to transmit IDLE codes during a transmission pause generates an invalid code group and causes the monitoring arrangement to respond.

17. The network of claim 16, wherein the method is used in the network according to a SERCOS standard.

18. The network of claim 16, wherein the false carrier indication signal is provided by an Ethernet interface circuit.

19. The network of claim 16, wherein the network includes at least two stations of an industrial manufacturing system.

* * * * *